Nov. 9, 1965 L. KATZ 3,216,496

HEAT SINK FOR ELECTRONIC DEVICES

Filed Feb. 1, 1961

INVENTOR.

Leonhard Katz

BY

Roberts, Cushman & Grover

ATT'YS

United States Patent Office 3,216,496
Patented Nov. 9, 1965

3,216,496
HEAT SINK FOR ELECTRONIC DEVICES

Leonhard Katz, Woburn, Mass., assignor to Astro Dynamics, Inc., Cambridge, Mass., a corporation of Massachusetts Filed Feb. 1, 1961, Ser. No. 86,530
8 Claims. (Cl. 165—185)

This invention relates to heat exchangers and more particularly to heat sinks for electronic devices.

In certain applications, electronic devices and more particularly semiconductor diodes and transistors develop appreciable quantities of heat. Further, these same components are typically sensitive to heat. High temperatures may both cause a degradation of performance and, if continued, lead to the destruction of the component. In some transistor circuits there is a danger of a progressive situation in which a high temperature causes the production of even more heat until the transistor breaks down. Thus there exists a very real need for a means of removing heat from these heat producing elements. In many applications where the use of transistors is desirable, however, there is also a need to keep weight down. Typical such uses are in the instrumentation assemblies of aircraft and missiles.

Accordingly, objects of the present invention are to provide a means for removing heat from heat producing elements which will rapidly conduct away substantial quantities of heat, which thereby increases the maximum power ratings of the heat producing elements, which is of light weight, which is compact, which is structurally strong, and which is itself adapted to be electrically insulated so that the heat-producing element need not be provided with insulation, such insulation tending to hamper heat removal.

Further objects are to provide such a means which may itself be conveniently mounted and which includes a convenient and accessible means for mounting a heat-producing element, which is adapted to be readily combined with similar units thereby forming compact and sturdy assemblies of greater heat handling capacity which may be used for cooling a plurality of heat-producing elements, those assemblies also providing convenient access to the heat-producing elements, and which is of relatively simple and inexpensive construction.

In the attainment of these objects the present invention contemplates a heat sink in which a relatively heavy, substantially flat bar conductively joins a means for receiving a heat-producing element and a plurality of parallel heat-radiating fins.

In one aspect the bar is slotted for receiving the fins and the material of the bar between the slots is swaged so that there is formed an intimate, heat conductive junction between bars and fins.

In a preferred embodiment the bar includes at one end a short transverse leg which is apertured edgewise of the bar, by which apertured leg the heat sinks according to the present invention may be mounted and may be formed into compact and efficient multiple assemblies.

For purposes of illustration a preferred embodiment of the present invention is shown in the accompanying drawings in which FIG. 1 is a side elevation of a heat sink;

FIG. 2 is a top view of the heat sink;

FIG. 3 diagrammatically illustrates a method of attaching fins to a bus bar;

Figure 1:
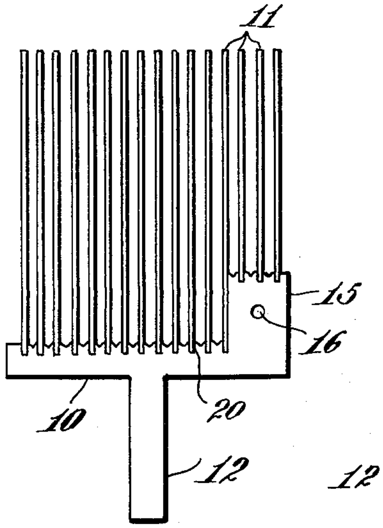
Figure 2:
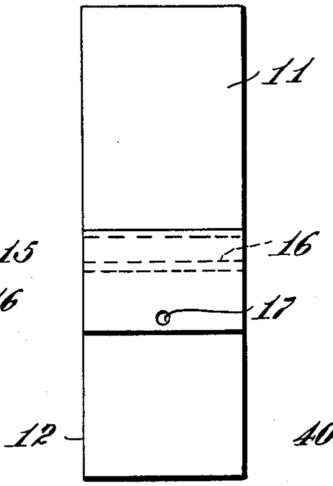

Referring now to the drawings, FIG. 1 shows a heat sink according to the present invention wherein a relatively thick thermal bus bar 10 conductively joins a shelf 12 for mounting a semi-conductor device and a plurality of heat-radiating fins 11. For reasons hereinafter discussed the bus bar 10 is preferably substantially flat and has at one end a short transverse leg 15 which is apertured as at 16. Preferably also, the bus bar 10 is longitudinally apertured as at 17 (FIG. 2) and has the mounting shelf 12 projecting from a point substantially midway its length. The bus bar 10 has, on its flat side opposite the shelf 12 and on the end of the transverse leg 15 a plurality of slots 20 for receiving the fins 11. The slots 20 extend transversely to the length of the bar and are arranged so as to hold the fins 11 in substantially parallel relationship. The fins themselves are strip-shaped and preferably of width equal that of the bus bar 10.

In this preferred embodiment each of the elements is made of aluminum or an aluminum alloy. Aluminum is preferable in that it has both a high conductivity and high physical strength with respect to its weight. In order to provide the lowest possible thermal resistance at a point through which the entire heat load must pass the shelf 12 is integrally joined with the bus bar 10. Because of difficulties in fabrication, however, the fins 11 typically cannot be integral with the bus bar 10. If the fins 11 are to be suitably spaced an integral assembly could neither be extruded nor economically machined. Accordingly the present invention contemplates that the slots 20 for receiving the fins 11 be milled into the bus bar 10. An advantage of cutting the slots after the bar is formed is that the spacing of the fins may be subsequently determined so as to provide optimum heat transfer in the sink's ultimate application.

Figure 3:
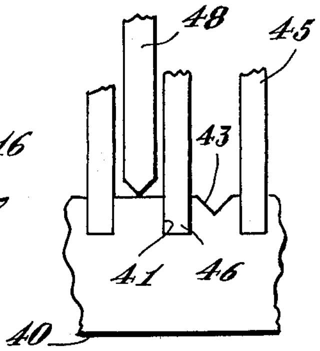

The present invention contemplates overcoming any adverse thermal effects flowing from a non-integral assembly by providing a method of joining the fins 11 to the bus bar 10 which creates a very intimate junction of exceptionally low thermal resistance. FIG. 3 illustrates such a method in somewhat diagrammatic form. In this method the bus bar, here indicated by numeral 40, is provided with a plurality of slots 41 conforming quite closely in cross-section to the ends 46 of the fins 45. The fins 45 and the bus bar 40 are assembled with adjacent surfaces being clean, uncorroded, and otherwise free of thermally insulating foreign matter. The material 43 between adjoining slots is then upset or swaged into intimate contact with the fins 45 as by a hydraulic press operating through a knife-edged tool 48, the high pressure developed causing the material 43 to move in cold flow. The tool 48 preferably extends the full width of the bus bar 40 and the fins 45 so that maximum contact is established.

A feature of this particular arrangement of elements is that, where a single heat sink is being used or where a multiplicity of such sinks are combined into an assembly of greater power capacity, the heat producing element, such as a transistor or a semiconductor diode, is accessible for replacement, connection, or experiment without disturbing the elements of the sink.

Figure 4:
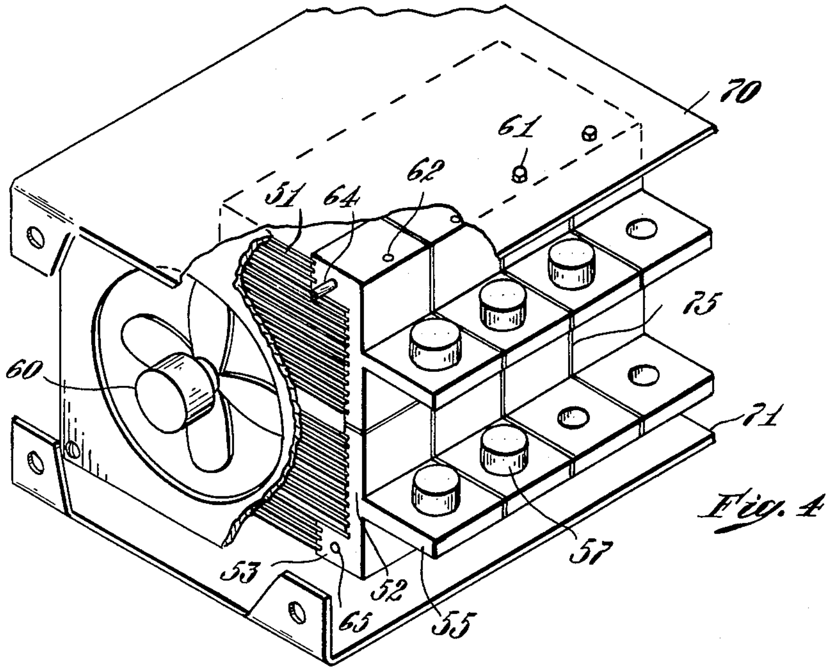
FIG. 4 is an isometric view of a plurality of heat sinks combined into an assembly for use with forced air circulation.

As shown in FIG. 4 such heat sinks are also readily combined in multiple assemblies. In the assembly shown, heat sinks 50 according to the present invention are arranged with their respective apertured transverse legs 53 located at the corners of a rectangle whose height is equal to twice the length of a single bus bar 52, opposing pairs being arranged fin to fin. With the mounting shelves 55 being located substantially in the middle of the length of the bus bars 52 the assembly takes on a symmetrical character. The heat-producing elements, here shown as transistors 57, may be mounted on either side of the shelves so as to facilitate circuit wiring.

Thus arranged, the heat sinks form a substantially closed duct which may be of any desired length (here shown as four sinks deep) and which may be provided with forced air circulation as by the fan 60. Each side of the assembly may be held together by bolts 61 passing through the apertures 62 and locking each top sink to the one immediately below and by bolts 64 passing through the apertures 65 and locking together successive layers of the sink assembly. To complete the assembly there need only be added top and bottom plates 70 and 71 respectively which join the opposing sides together, fins 51 extending inwardly.

Figure 5:
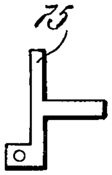
FIG. 5 is a plan view of an insulator for use between heat sinks.
Figure 6:
FIG. 6 is a side view of the insulator.

In certain types of transistors and semiconductor diodes the case of the device is electrically connected to one of the electrical elements. This is typically done so that a layer of electrical insulation will not inhibit the flow of heat away from the crystal junction, good electrical insulators also typically being good thermal insulators. Likewise, it is desirable that the case be joined in a highly conductive metal-to-metal junction to the heat sink. For facilitating such an arrangement the present invention provides that the individual heat sinks may themselves be insulated each from the others and also from any external apparatus. In that each sink functions essentially independently and contacts other elements at only a few points, such insulation is easily incorporated into the structure. An insulating gasket 75 (FIGS. 5 and 6) of contour similar to the bus bar may be inserted between laterally adjacent sinks (as shown in FIG. 4). An apertured insulating strip may be placed between vertically adjacent sinks and between the sinks and the adjacent top and bottom plates, and insulating tubes and washers may be placed between the bolts 61 and 64 and the corresponding sinks. The fins 51 facing across the width of the assembly will normally not touch.

It should be understood that the present disclosure is for the purpose of illustration only and that the present invention includes all modifications and equivalents falling within the scope of the appended claims.

I claim:

1. Heat dissipating apparatus comprising a substantially flat plate having at one end thereof a block extending transversely from one side of said plate and terminating in a surface spaced from said side of said plate, said surface and said side of said plate having a plurality of fins extending transversely therefrom, said block being substantially thicker than said fins, the opposite side of said plate having a thermal bus bar shelf extending transversely therefrom provided with means adapted to support a heat generating member thereon, there distance between said surface and said opposite side of said plate being substantially greater than the distance between said sides of said plate, the opposite end of said plate being adapted to be abutted with the corresponding end of another such plate, whereby a duct may be constituted with the block of each plate at a corner of the duct.

2. The apparatus of claim 1, said block having a bore therethrough from end to end parallel to said surface, for receiving an elongated mounting element.

3. The apparatus of claim 2, said plate having a bore therethrough perpendicular to the bore of said block for receiving an elongated mounting element.

4. Heat dissipating apparatus comprising a substantially flat rectangular plate having at one end thereof a rectangular block extending perpendicularly from one side of said plate and terminating in a surface parallel to said side of said plate, said surface and said side each having a plurality of substantially parallel planar fins extending perpendicularly therefrom, the opposite side of said plate having intermediate its ends a thermal bus bar shelf extending perpendicularly from said opposite side provided with means adapted to support a heat generating member thereon, the distance between said surface and said opposite side of said plate being substantially greater than the distance between said sides of said plate, the opposite end of said plate being adapted to be abutted with the corresponding end of another such plate, whereby a duct may be constituted with the block of each plate at a corner of the duct.

5. Heat dissipating apparatus comprising a pair of substantially flat rectangular plates each having at one end thereof a rectangular block extending perpendicularly from one side of the plate and terminating in a surface parallel to said side of the plate, said side and said surface having a plurality of parallel planar fins extending perpendicularly therefrom, the opposite side of each plate having intermediate its ends a thermal bus bar shelf extending perpendicularly therefrom and having means for supporting a heat generating member thereon, the distance between said surface and said opposite side of each plate being substantially greater than the distance between the sides of the plate, said plates being aligned with said one ends remote from each other and the opposite ends of said plate adjacent one another, all of said fins extending in the same direction from said one side of said plates, said shelves extending in the opposite direction from said other side of said plates.

6. The apparatus of claim 5, further comprising an elongated connector extending through said plates from the block of one plate to the block of the other plate.

7. The apparatus of claim 6, further comprising a second pair of said plates arranged like the first-mentioned pair in edge-to-edge alignment with the first-mentioned pair, and elongated connector means extending through aligned adjacent blocks of said pairs.

8. The apparatus of claim 7, further comprising insulation between said pairs of plates.

References Cited by the Examiner

UNITED STATES PATENTS

| | | | |
|---|---|---|---|
| 1,921,927 | 8/33 | Jones et al. | 165—183 |
| 2,417,629 | 3/47 | Bronander | 257—261.2 |
| 2,965,819 | 12/60 | Rosenbaum | 257—1 |
| 3,081,824 | 3/63 | McCall | 165—179 |

ROBERT A. O'LEARY, *Primary Examiner.*

HERBERT L. MARTIN, CHARLES SUKALO, PERCY L. PATRICK, *Examiners.*